United States Patent [19]

Blount

[11] 4,260,696

[45] Apr. 7, 1981

[54] PROCESS FOR THE PRODUCTION OF POLYURETHANE SILICATE FOAMS AND RESINOUS PRODUCTS UTILIZING ALDEHYDE-BROKEN DOWN ALKALI METAL CELLULOSE SILICATE POLYMER

[76] Inventor: David H. Blount, 5450 Lea St., San Diego, Calif. 92105

[21] Appl. No.: 157,515

[22] Filed: Jun. 9, 1980

Related U.S. Application Data

[63] Continuation-in-part of Ser. No. 13,139, Feb. 21, 1979, Pat. No. 4,226,982.

[51] Int. Cl.³ .............................................. C08F 283/00
[52] U.S. Cl. .................................. 525/477; 260/37 N; 521/154; 528/44; 528/67; 528/69; 528/73
[58] Field of Search .................... 525/477; 528/44, 67, 528/69, 73; 521/154

[56] References Cited

U.S. PATENT DOCUMENTS

| | | | |
|---|---|---|---|
| 4,153,768 | 5/1979 | Blount | 521/128 |
| 4,185,147 | 1/1980 | Blount | 521/154 |
| 4,226,982 | 10/1980 | Blount | 536/101 |

Primary Examiner—Morton Foelak

[57] ABSTRACT

Organic polyisocyanates are reacted chemically with aldehyde-broken down alkali metal cellulose silicate polymers to produce polyurethane products.

14 Claims, No Drawings

PROCESS FOR THE PRODUCTION OF POLYURETHANE SILICATE FOAMS AND RESINOUS PRODUCTS UTILIZING ALDEHYDE-BROKEN DOWN ALKALI METAL CELLULOSE SILICATE POLYMER

CROSS-REFERENCE TO RELATED APPLICATIONS

This application is a continuation-in-part of my copending U.S. Patent Application, Ser. No. 13,139, filed Feb. 21, 1979, now U.S. Pat. No. 4,226,982.

BACKGROUND OF THE INVENTION

This invention relates to a process for the production of polyurethane silicate foams and resinous products utilizing aldehyde-broken down alkali metal cellulose silicate polymer. The polyurethane may be produced as an isocyanate-terminated polyurethane silicate prepolymer then cured with a curing agent to produce a polyurethane silicate foam or resinous product.

The polyurethane silicate foams and resinous products of this invention may be utilized as coating agents, as fibers, as thermal and sound insulation material, as flotation materials in boats, shock-resistant packaging agents, as adhesives, as putty material, as constructional components of a building, etc. The polyurethane silicate foams of this invention are novel and economical. The foams may be sprayed or mixed in place.

Polyurethane foams or resinous products are produced by mixing and reacting the following components:

Component (a): Aldehyde broken down alkali metal silicate cellulose;
Component (b): Organic polyisocyanate or polyisothiocyanate;
Component (c): Optionally a curing agent and/or an initiator.

COMPONENT A

Aldehyde broken down alkali metal cellulose silicate polymers are produced by reacting an aldehyde with a broken down water soluble cellulose silicate polymer. The production of aldehyde broken down alkali metal cellulose silicate polymers is outlined in U.S. Patent Application No. 029,202, filed Apr. 12, 1979, by David H. Blount, and is incorporated into this application.

The broken down water soluble cellulose silicate polymer is produced by heating a mixture of 3 parts by weight of a cellulose-containing plant, 2 to 5 parts by weight of an alkali metal hydroxide and 1 to 2 parts by weight of an oxidated silicon compound to 150° to 220° C. with agitating for 5 to 60 minutes. The broken down alkali metal cellulose silicate polymer is soluble in water, alcohols, polyols and other organic solvents and is a thick liquid above 150° C. and a brown solid below 150° C. The broken down alkali metal cellulose silicate polymer has lost a carbon dioxide radical from each molecule and the lignin-cellulose bond appears to be intact. When a plant product (cellulose) with the lignin removed is used in the production of broken down alkali metal cellulose silicate polymer, a dark brown to black colored water soluble polymer is produced.

Any suitable alkali metal hydroxide may be used to produce broken down alkali metal cellulose silicate polymers; sodium hydroxide is preferred. Any suitable cellulose containing plant or plant product may be used to produce broken down alkali metal cellulose polymers such as trees, shrubs, agricultural plants, pulp wood, cotton, partially decomposed cellulose-containing plants such as humus, peat and certain soft brown coal, sea weed, etc.

Any suitable oxidated silicon compound may be used in this invention. Suitable oxidated silicon compounds include silica, e.g., hydrated silica, hydrated silica containing Si-H bonds (silicoformic acid), silica sol, silicic acid, silica, etc., alkali metal silicates, e.g., sodium silicate, potassium silicate, lithium silicate, etc., natural silicates with free silicic acid groups and mixtures thereof.

Hydrated silica is the preferred oxidated silicon compound.

Any suitable aldehyde may be used to produce aldehyde broken down alkali metal cellulose silicate polymers such as formaldehyde, acetaldehyde, butyl aldehyde, chloral, acrolein, furfural, benzaldehyde, crotonaldehyde, propionaldehyde, pentanals, hexanals, heptanals, octanals and their simple substitution products, semi-acetate and full acetals, paraformaldehyde and mixtures thereof. Compounds containing active aldehyde groups such as hexamethylene tetramine, phenoplasts and aminoplasts may also be used.

The aldehyde broken down alkali metal cellulose silicate polymer is produced by mixing 1 to 5 parts by weight of the aldehyde with 2 parts by weight of the powdered broken down alkali metal cellulose polymer then agitate the mixture at ambient temperature to just below the boiling point of the reactants for 10 to 120 minutes. An aqueous solution of the broken down alkali metal cellulose silicate polymer may be used.

Component B

Any suitable organic polyisocyanate may be used according to the invention, including aliphatic, cycloaliphatic, araliphatic, aromatic and heterocyclic polyisocyanates and mixtures thereof. Suitable polyisocyanates which may be employed in the process of the invention are exemplified by the organic diisocyanates which are compounds of the general formula:

$$O=C=N-R-N=C=O$$

wherein R is a divalent organic radical such as an alkylene, aralkylene or arylene radical. Such suitable radicals may contain, for example, 2 to 20 carbon atoms. Examples of such diisocyanates are:
tolylene diisocyanate,
p,p'-diphenylmethane diisocyanate,
phenylene diisocyanate,
m-xylylene diisocyanate,
chlorophenylene diisocyanate,
benzidene diisocyanate,
naphthylene diisocyanate,
decamethylene diisocyanate,
hexamethylene diisocyanate,
pentamethylene diisocyanate,
tetramethylene diisocyanate,
thiodipropyl diisocyanate,
propylene diisocyanate,
ethylene diisocyanate.

Other polyisocyanates, polyisothiocyanates and their derivatives may be equally employed. Fatty diisocyanates are also suitable and have the general formula:

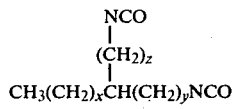

where x+y totals 6 to 22 and z is 0 to 2, e.g., isocyanastearyl isocyanate.

It is generally preferred to use commercially readily available polyisocyanates, e.g., tolylene-2,4- and -2,6-diisocyanate and any mixtures of these isomers ("TDI"), polyphenyl-polymethylene-isocyanates obtained by aniline-formaldehyde condensation followed by phosgenation ("crude MDI"), and modified polyisocyanate containing carbodiimide groups, allophanate groups, isocyanurate groups, urea groups, imide groups, amide groups or biuret groups, said modified polyisocyanates prepared by modifying organic polyisocyanates thermally or catalytically by air, water, urethanes, alcohols, amides, amines, carboxylic acids, or carboxylic acid anhydrides, phosgenation products of condensates of aniline or anilines alkyl-substituted on the nucleus, with aldehydes or ketones may be used in this invention. Solutions of distillation residues accumulating during the production of tolylene diisocyanates, diphenyl methane diisocyanate, or hexamethylene diisocyanate, in monomeric polyisocyanates or in organic solvents or mixtures thereof may be used in this invention. Organic triisocyanates such as triphenylmethane triisocyanate may be used in this invention. Cycloaliphatic polyisocyanates, e.g., cyclohexylene-1,2-; cyclohexylene 1,4-; and methylene-bis (cyclohexyl-4,4') diisocyanate may be used in this invention. Suitable polyisocyanates which may be used according to the invention are described, e.g., by W. Siefkin in Justus Liebigs Annalen der Chemie, 562, pages 75 to 136. Inorganic polyisocyanates are also suitable according to the invention.

Organic polyhydroxyl compounds (polyols) may be used in this invention with polyisocyanates or may be first reacted with a polyisocyanate to produce isocyanate-terminated polyurethane prepolymers and then also used in this invention.

Reaction products of from 50 to 99 mols of aromatic diisocyanates with from 1 to 50 mols of conventional organic compounds with a molecular weight of, generally, from about 200 to about 10,000 which contain at least two hydrogen atoms capable of reacting with isocyanates, may also be used. While compounds which contain amino groups, thiol groups, carboxyl groups or silicate groups may be used, it is preferred to use organic polyhydroxyl compounds, in particular, compounds which contain from 2 to 8 hydroxyl groups, especially those with a molecular weight of from about 800 to about 10,000 and preferably from about 1,000 to about 6,000, e.g., polyesters, polyethers, polythioethers, polyacetals, polycarbonates or polyester amides containing at least 2, generally from 2 to 8, but preferably dihydric alcohols, with the optional addition of trihydric alcohols, and polybasic, preferably dibasic, carboxylic acids. Instead of the free polycarboxylic acids, the corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated; examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterephthalate and bis-glycol terephthalate. Any suitable polyhydric alcohol may be used such as, for example, ethylene glycol; porpylene-1,2- and -1,3-glycol; butylene-1,4- and -2,3-glycol; hexane-1,6-diol; octane-1,8-diol; neopentyl glycol; cyclohexanedi-omethanol-(1,4-bis-hydroxymethylcyclohexane); 2-methylpropane-1,3-diol; glycerol; trimethylol propane; hexane-1,2,6-triol; butane-1,2,4-triol; trimethylol ethane; pentaerythritol; quinitol; mannitol and sorbitol; methylgycoside; deithylene glycol; triethylene glycol; tetraethylene glycol; polyethylene glycols; dipropylene glycol; polypropylene glycols; dibutylene glycol and polybutylene glycols. The polyesters may also contain a proportion of carboxyl end groups. Polyesters of lactones, such as ε-caprolactone, or hydroxycarboxylic acid such as ω-hydroxycaproic acid, may also be used.

The polyethers with at least 2, generally from 2 to 8 and preferably 2 or 3, hydroxyl groups used according to the invention are known and may be prepared, e.g., by the polymerization of epoxides, e.g., ethylene oxide, propylene oxide, butylene oxide, tetrahydrofurane oxide, styrene oxide or epichlorohydrin, each with itself, e.g., in the presence of $BF_3$, or by addition of these epoxides, optionally as mixtures or successively, to starting components which contain reactive hydrogen atoms such as alcohols or amines, e.g., water, ethylene glycol; propylene-1,3- or -1,2-glycol; trimethylol propane; 4,4-dihydroxydiphenylpropane, aniline, ammonia, ethanolamine or ethylenediamine; sucrose polyethers such as those described, e.g., in German Auslegeschriften Nos. 1,176,358 and 1,064,938, may also be used according to the invention. It is frequently preferred to use polyethers which contain predominantly primarily OH groups (up to 90% by weight, based on the total OH groups contained in the polyether). Polyethers modified with vinyl polymers such as those which may be obtained by polymerizing styrene or acrylonitrites in the presence of polyethers, (U.S. Pat. Nos. 3,383,351; 3,304,273; 3,523,093 and 3,110,695 and German Pat. No. 1,152,536) and polybutadienes which contain OH groups are also suitable.

By "polythiethers" are meant, in particular, the condensation products of thiodiglycol with itself and/or with other glycols, dicarboxylic acids, formaldehyde, aminocarboxylic acids or amino alcohols. The products obtained are polythio-mixed ethers, polythioether esters or polythioether ester amides, depending on the cocomponent.

The polyacetals used may be, for example, the compounds which may be obtained from glycols, e.g., diethylene glycol, triethylene glycol (4,4'-dihydroxydiphenyldimethylmethane), hexanediol and formaldehyde. Polyacetals suitable for the invention may also be prepared by the polymerization of cyclic acetals.

The polycarbonates with hydroxyl groups used may be of the known kind, e.g., those which may be prepared by reacting diols, e.g., propane -1,3-diol, butane-1,4-diol and/or hexane-1,6-diol or diethylene glycol, triethylene glycol or tetraethylene glycol, with diarylcarbonates, e.g., diphenylcarbonate or phosgene.

The polyester amides and polyamides include, e.g., the predominantly linear condensates obtained from polyvalent saturated and unsaturated carboxylic acids or their anhydrides and polyvalent saturated and unsaturated amino alcohols, diamines, polyamines and mixtures thereof.

Examples of these compounds which are to be used, according to the invention have been described in High Polymers, Volume XVI, "Polyurethanes, Chemistry and Technology", published by Saunders-Frisch Interscience Publishers, New York, London, Volume I, 1962, pages 32 to 42 and pages 44 to 54, and Volume II, 1964, pages 5 and 16 pages 198 and 199; and in Kunststoff-Handbuch, Volume VII, Vieweg-Hochtlen, Carl-Hanser-Verlag, Munich, 1966, on pages 45 to 71.

If the polyisocyanates or the prepolymer which contains NCO groups have a viscosity above 2000 cP at 25° C., it may be advantageous to reduce the viscosity thereof by mixing it with a low-viscosity organic polyisocyanate and/or an inert blowing agent or solvent.

Inorganic polyisocyanates and isocyanate-terminated polyurethane silicate prepolymers may also be used in this invention.

Polyisocyanate curing agents and/or polyisocyanate activators (catalysts) may be used in the process of producing polyurethane silicon acid resinous or foamed products. The following are examples of polyisocyanate curing agents and activators:

1. Water.
2. Water containing 10% to 70% by weight of an alkali metal silicate, such as sodium and/or potassium silicate. Crude commercial alkali metal silicate may contain any substances, e.g., calcium silicate, magnesium silicate, borates and aluminates and may also be used. The molar ratio of $Me_2OSiO_2$ (Me=metal) is not critical and may vary within the usual limits, but is preferably between 4 to 1 and 0.2 to 1.
3. Water containing 20% to 50% by weight of ammonium silicate.
4. Water containing 5% to 40% by weight of magnesium oxide in the form of a colloidal dispersion.
5. Alkali metal metasilicate such as sodium metasilicate, potassium metasilicate, and commercial dry granular sodium and potassium silicates. Heating is required to start the curing reaction.
6. Water containing 25% to 70% by weight of silica sol.
7. Activators (catalysts) which act as curing agents and are added to the polyurethane silicate prepolymer in the amount of 0.001% to 10% by weight. They may be added in water.
   (a) Tertiary amines, e.g., triethylamine; tributylamine; N-methyl-morpholine; N-ethylmorpholine; N,N,N', N'-tetramethylenediamine; 1,4-diazo-bicyclo-(2,2,2)-octane; N-methyl-N'-dimethylaminoethyl piperazine; N,N-dimethyl benzylamine; bis(N,N-diethylaminoethyl)-adipate; N,N-diethylbenzylamine; pentamethyldiethylenetriamine; N,N-dimethycyclohexylamine; N,N,N', N'-tetramethyl-1, 3-butanediamine; N,N-dimethyl-betaphenylethylamine; and 1,2-dimethylimidaxole. Suitable tertiary amine activators which contain hydrogen atoms which are reactive with isocyanate groups include, e.g., triethanolamine; triisopanolamine; N,N=dimethylethanol-amine; N-methyldiethanolamine; N-ethyl-diethanolamine; and their reactive products with alkylene oxides, e.g., propylene oxide and/or ethylene oxide and mixtures thereof.
   (b) Organo-metallic compounds, preferably organo-tin compounds such as tin salts or carboxylic acid, e.g., tin acetate, tin octoate, tin ethyl hexoate, and tin laurate and the dialkyl tin salts of carboxylic acids, e.g., dibutyl tin diacetate, dibutyl tin dilaurate, dibutyl tin maleate or diocyl tin diacetate.
   (c) Silaamines with carbon-silicon bonds as described, e.g., in British Pat., No. 1,090,589, may also be used as activators, e.g., 2,2,4-trimethyl-1,2-silamorpholine or 1,3-diethylaminoethyl-tetramethyldisiloxane.
   (d) Other examples of catalysts which may be used according to the invention, and details of their action, are described in Kunststoff-Handbuch, Volume, VII, published by Vieweg and Hochtlen, Carl-Hanser-Verlag, Munich, 1966, e.g., on pages 96 and 102.
8. Water containing 1% to 10% by weight of bases which contain nitrogen such as tetraalkyl ammonium hydroxides.
9. Water containing 1% to 10% by weight of alkali metal hydroxides such as sodium hydroxide; alkali metal phenolates such as sodium phenolate or alkali metal alcoholates such as sodium methylate.
10. Water containing sodium polysulfide in the amount of 1% to 10% by weight.
11. Water containing 20% to 70% by weight of a water-binding agent, being capable of absorbing water to form a solid or a gel, such as hydraulic cement, synthetic anhydrite, gypsum or burnt lime.
12. Mixtures of the above-named curing agents.

surface-active (emulsifiers and foam stabilizers) may also be used according to the invention. Suitable emulsifiers are, e.g., the sodium salts of ricinoleic suphonates or of fatty acid, or salts of fatty acids with amines, e.g., oleic acid diethylamine or stearic acid diethanolamine. Other surface-active additives are alkali metal or ammonium salts of sulphonic acids, e.g., dodecylbenzine sulphonic acid or dinaphthyl methane disulphonic acid; or of fatty acids, e.g., ricinoleic acid, or of polymeric fatty acids.

The foam stabilizers used are mainly water-soluble polyester siloxanes. These compounds generally have polydimethylsiloxane group attached to a copolymer of ethylene oxide and propylene oxide. Foam stabilizers of this kind have been described, e.g., in U.S. Pat. No. 3,629,308. These additives are preferably used in quantities of 0% to 20%, but preferably 0.01% to 20% by weight, based on the reaction mixture.

Negative catalysts, for example, substances which are acidic in reaction, e.g., hydrochloric acid or organic acid halides, known cell regulators, e.g., paraffins, fatty alcohols or dimethyl polysiloxanes, pigments or dyes, known flame-retarding agents, e.g., tris-chlorethylphosphate or ammonium phosphate and polyphosphates, stabilizers against aging and weathering plasticizers, fungicidal and bacteriocidal substances, and fillers, e.g., barium sulphate, kieselguhr, carbon black or whiting, may also be used according to the invention.

Further examples of surface additives, foam stabilizers, call regulators, negative catalysts, stabilizers, flame-retarding substances, plasticizers, dyes, fillers and fungicidal and bacteriocidal substances, and details about methods of using these additives and their action may may be found in Kunststoff-Handbuch, Volume VI, published by Vieweg and Hochtlen, Carl-Hanser-Verlag, Munich, 1966, e.g., on pages 103 to 113. The halogenated paraffins and inorganic salts of phosphoric acid are the preferred fire-retarding agents.

The preferred curing agent is an aqueous solution of silicates, sodium silicate and/or potassium silicate in water which is normally known as water glass. Aqueous solutions of silicates may be prepared in the form of 25% to 54% silicates. Silica sols which may have an alkaline or acid pH may also be used; they should have solid contents of 15% to 50%. Silica sols are generally used in combination with aqueous silicate solutions. The choice of concentration depends mainly on the desired end product. Compact materials or materials with closed cells are preferably produced with concentrated silicated solutions which, if necessary, are adjusted to a lower viscosity by addition of alkali metal hydroxide. Solutions with concentrations of 40% to 70% by weight can be prepared in this way. On the other hand, to produce open-celled, light-weight foams, it is preferred to use silicate solutions with concentrations of 20% to 45% by weight in order to obtain low viscosities, sufficiently long reaction times and low unit weights. Silicate solutions with concentrations of 15% to 45% are also preferred when substantial quantities of finely divided inorganic fillers are used.

Suitable flame-resistant compounds may be used in the products of this invention such as those which contain halogen or phosphorus, e.g., tributylphosphate; tris(2,3-dichloropropyl)-phosphate; polyoxypropylene-chloromethylphosphonate; cresyldiphenylphosphate; tricresylphosphate; tris-(beta-chloroethyl)-phosphate; tris-(2,3-dichloropropyl)-phosphate; triphenyl-phosphate; ammonium phosphate; perchloroinated diphenyl phosphate; perchlorinated terephenyl phosphate; hexabromocyclodecane; tribromophenol; dibromopropyldiene, hexabromobenzene; octabromodiphenylether; pentabromotoluol; poly-tribromostyrol; tris-(bromocresyl)-phosphate; tetrabromobis-phenol A; tetrabromophthalic acid anhydride; octabromodiphenyl phosphate; tri-(dibromopropyl)-phosphate; calcium hydrogen phosphate; sodium or potassium dihydrogen phosphate; disodium or dipotassium hydrogen phosphate; ammonium chloride; phosphoric acid; polyvinylchloride tetomers chloroparaffins as well as further phosphorus- and/or halogen-containing flame-resistant compounds as they are described in Kunststoff-Handbuch, Volume VII, Munich, 1966, pages 110 and 111, which are incorporated herein by reference. The organic halogen-containing components are, however, preferred in the polyurethane silicate products.

When halogen or phosphorus compounds are added, no toxic gas is given off in the event of a very intense heat because the HCl or HBr reacts with the alkali metal atoms to form a salt, such as NaCl, and NaBr.

In the cases where the viscosity of the polyisocyanate is too high, it may be reduced by adding a low-viscosity isocyanate, or even by adding inert solvents such as acetone, diethyl ether of diethylene glycol, ethyl acetate and the like.

In cases where the curing agent contains an aqueous alkali silicate, the isocyanate-terminated polyurethane prepolymer may be sulphonated. It is usually sufficient to react the isocyanate-terminated polyurethane prepolymer with concentrated sulphuric acid or oleum of sulfur trioxide in order to produce a sulphonated poly(urethane silicate) prepolymer containing the sulphonic group in the amount of 3–100 milliequivalents/100 g.

The reaction will take place by thoroughly mixing the sulphuric acid or oleum or sulfur trioxide with the isocyanate-terminated polyurethane prepolymer at ambient temperature and pressure. In some cases where sulfur trioxide is used, an increased pressure is advantageous. The polyisocyanate may be modified to contain ionic groups before reacting with the polyestersilicate resinous products.

The sulphonated isocyanate-terminated polyurethane prepolymer can be directly mixed with an aqueous silicate solution, in which case the corresponding metal salt is formed in situ. The sulphonated isocyanate-terminated polyurethane prepolymer may be completely or partly neutralized at the onset by the addition of animes, metal alcoholates, metal oxides, metal hydroxide or metal carbonates.

Water-binding components may be used in this invention, including organic or inorganic water-binding substances which have, first, the ability to chemically combine, preferably irreversibly, with water and, second, the ability to reinforce the polyurethane plastics of the invention. The term "water-binding component" is used herein to identify a material, preferably granular or particulate, which is sufficiently anhydrous to be capable of absorbing water to form a solid or gel such as mortar or hydraulic cement.

A water-binding component such as hydraulic cement, synthetic anhydrides, gypsum or burnt lime may be added to any of the components to produce a tough, somewhat solid or cellular solid concrete. The water-binding component may be added in amounts from 0–200% by weight, based on the weight of Components a and b. When a water-binding agent is added and when the curing agent is an aqueous alkali metal silicate solution, a halogen or phosphorus-containing compound or mixture thereof may be added in the amount of 1% to 30% by weight, based on the weight of the reactants, Components a and b.

Suitable hydraulic cements are, in particular, Portland cement, quick-setting cement, blast-furnace Portland cement, mild-burnt cement, sulphate-resistant cement, brick cement, natural cement, lime cement, gypsum cement, pozzolan cement and calcium sulphate cement. In general, any mixture of fine ground lime, alumina and silica that will set to a hard product by admixture of water, which combines chemically with the other ingredients to form a hydrate, may be used. There are many kinds of cement which can be used in the production of the compositions of the invention and they are so well known that a detailed description of cement will not be given here; however, one can find such a detailed description in Encyclopedia of Chemical Technology, Volume 4, Second Edition, Published by Kirk-Othmer, pages 684–710, of the type of cement which may be used in the production of this invention and are incorporated herein by reference.

Organic blowing agents may be used to improve or increase the foaming to produce cellular solid plastics such as acetone, ethyl acetate, methanol, ethanol, halogenated alkanes, e.g., methylene chloride, chloroform, ethylidene chloride, vinylidene chloride, monofluorotrichloromethane, chlorodifluoromethane, butane, hexane or diethyl ether. Compounds which decompose at temperatures above room temperature with liberation of gases, e.g., nitrogen, such as azo compounds, azoisobutyric acid nitrile, may also act as blowing agents. Compressed air may act as a blowing agent. Other examples of blowing agents and details about the use of blowing agents are described in Kunststoff-Handbuch, Volume VII, published by Vieweg and Hochtlen, Carl-Hanser-Verlag, Munich, 1966, e.g., on pages 108 and 109, 453 to 455 and 507 to 510.

The proportions of the components may be adjusted to a highly cellular solid. When water is used, it reacts with the NCO group to produce $CO_2$ and pores are produced in the produce by the evolved $CO_2$. In certain cases, the $CO_2$ is rapidly evolved and escapes before the product hardens, and a solid product can be produced, nearly completely free of air cells. When a high silicate content, from 80% to 99% by weight, is desirable, such as when the final product is required to have mainly the properties of an inorganic silicate plastic, in particular, high-temperature resistance and complete flame resistance, an alkali metal silicate may be added with Components a, b or c or be reacted with the polyisocyanate to produce a polyurethane silicon acid prepolymer. In that case, the function of the polyisocyanate is that of a non-volatile hardener whose reaction product is a high-molecular-weight polymer which reduces the brittleness of the product.

When an alkali catalyst or alkali metal silicate is used in the invention, fine metal powders, e.g., powdered calcium, magnesium, aluminum or zinc, may also act as the blowing agents by bringing about the evolution of hydrogen. Compressed air may be mixed in the components and may also be used to mix the components, then be used as the blowing agent. These metal powders also have a hardening and reinforcing effect.

The properties of the forms (cellular solid) obtained from any given formulation, e.g., their density in the moist state, depends to some extent on the details of the mixing process, e.g., the form and speed of the stirrer and the form of the mixing chamber, and also the selected temperature at which foaming is started. The foams will usually expand 3 to 12 times their original volume.

The polyurethane silicate plastics produced by the invention have many uses. The reaction mixtures, with or without a blowing agent, may be mixed in a mixing apparatus; then the reaction mixture may be sprayed by means of compressed air or by the airless spraying process onto surfaces; subsequently, the mixture expands and hardens in the form of a cellular solid which is useful for insulation, filling, and moisture-proofing coating. The foaming material may also be forced, poured or injection-molded into cold or heated molds, which may be relief molds or solid or hollow molds, optionally by centrifugal casting, and left to harden at room temperature or at temperatures up to 200° C., at ambient pressure or at elevated pressure. In certain cases, it may be necessary to heat the mixing or spraying apparatus to initiate foaming; then, once foaming has started, the heat evolved by the reaction between components continues and foaming until the reaction is complete. A temperature between 40° C. and 150° C. may be required to initiate foaming. The blowing agent is usually added to the polyisocyanate.

Reinforcing elements may quite easily be incorporated into the reaction mixtures. The inorganic and/or organic reinforcing elements may be, e.g., fibers, metal wires, foams, fabrics, fleeces or skeletons. The reinforcing elements may be mixed with the reaction mixtures, for example, by the fibrous web impregnation or by processes in which the reaction mixtures and reinforcing fibers are together applied to the mold, for example, by means of a spray apparatus. The shaped products obtainable in this way may be used as building elements, e.g., in the form of sandwich elements, either as such or after they have been laminated with metal, glass or plastics; if desired, these sandwich elements may be foamed. The products may be used as hollow bodies, e.g., as containers for goods which may be required to be kept moist or cool, as filter materials or exchanges as catalyst carriers or carriers of other active substances, as decorative elements, furniture components and fillings or for cavities. They may be used in the field of model building and mold building, and the production of molds for metal casting may also be considered.

Instead of blowing agents, finely divided inorganic or organic hollow particles, e.g., hollow expanded beads of glass, plastics and straw, may be used for producing cellular or solid products. These products may be used as insulating materials, cavity fillings, packaging materials, building materials which have good solvent resistance and advantageous fire-resistant characteristics. They may also be used as light-weight building bricks in the form of sandwiches, e.g., with metal-covering layers for house building and the construction of motor vehicles and aircraft.

Organic and inorganic particles which are capable of foaming up or have already been foamed may be incorporated in the fluid foaming reaction mixture, e.g., expanded clay, expanded glass, wood, cork, popcorn, hollow plastic beads such as beads of vinyl chloride polymers, polyethylene, styrene polymers, or foam particles of these polymers or other polymers, e.g., polysulphone, polyepoxide, polyurethane, poly (urethane silicate) copolymers, urea-formaldehyde, phenol-formaldehyde or polyimide polymers, or, alternatively, heaps of these particles may be permeated with foaming reaction mixtures to produce insulation materials which have good fire-resistant characteristics.

The cellular solid products of the invention, in the aqueous or dry or impregnated state, may subsequently be lacquered, metallized, coated, laminated, galvanized, vapor treated, bonded or blocked. The cellular solid products may be sawed, drilled, planed, polished, or other working processes may be used to produce shaped products. The shaped products, with or without a filler, may be further modified in their properties by subsequent heat treatment, oxidation processes, hot pressing, sintering processes or surface melting or other compacting processes.

The novel cellular solid products of the invention are also suitable for use of constructional materials due to their toughness and stiffness, yet they are still elastic. They are resistant to tension and compression and have a high dimensional stability to heat and high flame resistance. They have excellent sound-absorption capacity, heat-insulating capacity, fire resistance, and heat resistance which makes them useful for insulation. The cellular products of this invention may be foamed on the building site and, in many cases, used in place of wood or hard fiber boards. Any hollow forms may be used for foaming. The brittle foams may be crushed and used as a filler, as a soil conditioner, as a substrate for the propogation of seedlings, cuttings and plants or cut flowers.

The foamed or solid concrete produced by reacting the aldehyde-broken down alkali metal cellulose silicate polyol and polyisocyanate with a water-binding component may be used as surface coatings have good adhesion and resistance-to-abrasion properties, as mortars, and for making molded products, particularly in construction engineering and civil engineering such as for building walls, igloos, boats and for roadbuilding, etc. These products are light-weight, thermal-insulating materials with excellent mechanical properties and fire resistance. The amount of water-binding component used varies greatly, depending on the type of product desired, from 1% to 200% by weight, based on Component A and polyisocyanate. In certain cases, it is desirable to add sand and gravel in the amount of 1 to 6 parts by weight to each part by weight of the hydraulic cement. The mixture may be poured in place, troweled on or sprayed onto the desired surface to produce a solid or cellular solid product.

Fillers in the form of powders, granules, wire, fibers, dumb-bell shaped particles, crystallites, spirals, rods, beads, hollow beads, foam particles, non-woven webs, pieces of woven or knitted fabrics, tapes and pieces of foil of solid inorganic or organic substances, e.g., dolomite, chalk, alumina, asbestos, basic silicic acids, sand, talc, iron oxides, aluminum oxides and hydroxides, alkali metal silicates, zeolites, mixed silicates, calcium silicate, calcium sulphates, alumino silicates, cements, basalt wool or powder, glass fibers, carbon fibers, graphite, carbon black, Al-, Fe-, Cr - and Ag-powders, molybdenum sulphide, steel wool, bronze or copper meshes, silicon powder, expanded clay particles, hollow glass beads, glass powder, lava and pumica particles, wood chips, woodmeal, cork, cotton, straw, popcorn, coke or particles of filled or unfilled, foamed or unfoamed, stretched or unstretched organic polymers, may be added to the mixture of the Components a, b and c in many applications. Among the numerous organic polymers which may be used, e.g., as powders, granules, foam particles, beads, hollow beads, foamable (but non-yet-foamed) particles, fibers, tapes, woven fabrics, or fleeces, the following may be mentioned as examples: polystyrene, polyethylene, polypropylene, polyacrylonitrile, polybutadiene, polyisoprene, polytetrafluoroethylene, aliphatic and aromatic polyesters, malamine, urea, phenol resins, phenol silicate resins, polyacetals resins, polyepoxides, polyhydantoins, polyureas, polyethers, polyurethanes, polyimides, polyamides, polysulphones, polycarbonates and copolymers thereof.

The composite materials, according to the invention, may be mixed with considerable quantities of fillers without losing their advantageous properties, and, in particular, composite materials which consist predominantly of organic constituents which are preferably filled with inorganic fillers; where silicate constituents predominate, it is preferably filled with organic fillers. Fillers which are particularly preferred are chalk, talc, dolomite, gypsum, clay, anhydrite, glass, carbon and the conventional plastics and rubber waste.

In the production of surface coatings, bonds, putties or interlayers, particularly in the case of porous materials, it is preferred to use polyisocyanates which have only a low isocyanate content, e.g., less than 5%, or prepolymers which are free from isocyanate groups. The mixtures obtained in this way have a long pot life and may be applied in thin layers which gradually harden in the course of time. The liberated $CO_2$ acts as the curing agent. In a two-stage or multistage hardening in which, for example, in excess of water is used, there is a rapid evolution of $CO_2$ and the polyurethane silicon acid resinous product is converted into a workable form which may be used as putties, coating agents, grouting materials or mortar. This thermoplastic form may also be injection-molded, extruded or worked-up in a kneader.

In many cases, the polyurethane silicate resinous and foamed products produced by the invention are soluble in organic solvents and may be used as a tough coating agent for wood and metal. The mixtures of the invention are also suitable for use as impregnation agents for finishing fibers. The mixtures may also be extruded through dies or slots and converted into fibers and foils. These fibers and foils may be used for producing synthetic incombustible paper or fleeces.

When the aldehyde-broken down cellulose silicate polymer and polyisocyanate are combined with expanded clay and in alkali metal silicate solution, a very good concrete is obtained which can, for example, be used as panels in the construction field. In this case, the foam material (expanded clay) plays the part of the binding material.

Any suitable alkali metal silicate compound may be used in this invention such as sodium silicate, potassium silicate, lithium silicate, and mixtures thereof. Sodium metasilicate pentahydrate is preferred.

Any suitable oxidated silicon compound may be used in this invention such as hydrated silica, silicoformic acid, natural silicate containing free silicic acid groups and mixtures thereof. Fine granular hydrated silica is the preferred oxidated silicon compound.

Any suitable organic compound may be used in this invention; monohydroxyl alcohols, monocarboxylic acids, monophenol, monothiophenols, monothioalcohols and mixtures thereof are preferred.

Suitable organic compounds consist of organic amphiphilous compounds containing 1 to 9 carbon atoms and selected from the group consisting of monohydroxyl alcohols, monocarboxylic acids, monophenols, monothiophenols, monothioalcohols and mixtures thereof may be added to the isocyanate-terminated polyurethane silicate prepolymer up to an amount equal to 30% by weight of the isocyanate-terminated polyurethane silicate prepolymer.

The object of the present invention is to provide a novel process of producing polyurethane silicate products. Another object is to produce novel polyurethane silicate products which are relatively low in cost. Another object is to product polyurethane silicate products that may be used for thermal insulating, structal purposes, sound proofing, shock-resistant packaging, cushions, coating for wood and metals, adhesive, casting material, putty, foam concrete, etc.

DESCRIPTION OF PREFERRED EMBODIMENTS

My invention will be illustrated in greater detail by the specific examples which follow, it being understood that these preferred embodiments are illustrative of, but not limited to, procedures which may be used in the production of isocyanate-terminated polyurethane and polyurethane products. Parts and percentage are by weight unless otherwise indicated.

EXAMPLE 1

About 1 part by weight of granular formaldehyde-broken down alkali metal cellulose silicate copolymer produced by reacting 1 part by weight of an aqueous solution containing 37% formaldehyde with 1 part by weight of broken down alkali metal cellulose silicate (produced by reacting about equal parts by weight of dry fir sawdust and fine granular hydrated silica and lye flakes) is mixed with 99 parts by weight of tolylene diisocyanate ("TDI") at about 30° to 50° C. while agitating for 20 to 60 minutes thereby producing an isocyanate-terminated polyurethane silicate prepolymer.

EXAMPLE 2

About 99 parts by weight of the formaldehyde-broken down alkali metal cellulose silicate copolymer as used in Example 1 are mixed with 50 parts by weight of tolylene diisocyanate then agitated at a temperature between 30° to 50° C. for 20 to 60 minutes thereby producing an isocyanate-terminated polyurethane silicate prepolymer.

EXAMPLE 3

About 20 parts by weight of a fine granular crotonaldehyde-broken down cellulose silicate copolymer which was produced by reacting 1 part by weight of crotonaldehyde with 2 parts by weight of the fine granular broken down alkali metal cellulose silicate polymer (produced by reacting about equal parts by weight of sodium hydroxide, hydrated silica and pine sawdust) and 99 parts by weight of "crude MDI" are mixed then agitated between 30° to 50° C. for 20 to 60 minutes thereby producing an isocyanate-terminated polyurethane silicate prepolymer.

EXAMPLE 4

About 30 parts by weight of a fine granular acetaldehyde-broken down alkali metal cellulose silicate copolymer which was produced by reacting 1 part by weight of acetaldehyde with 3 parts by weight of broken down alkali metal cellulose silicate (produced by reacting 3 parts by weight of sodium hydroxide flakes, 1 part by weight of hydrated silica, 3 parts by weight of oak sawdust) and 75 parts by weight of modified diphenylmethane diisocyanate (ISONATE 143L produced by Upjohn Co.) are mixed then agitated at 30° to 50° C. for 20 to 60 minutes thereby producing an isocyanate-terminated polyurethane silicate prepolymer.

EXAMPLE 5

About 50 parts by weight of a fine granular acrolein-broken down alkali metal cellulose silicate copolymer which was produced by reacting about 1 part by weight of acrolein with 3 parts by weight of broken down alkali metal cellulose silicate (produced by reacting about equal parts by weight of potassium hydroxide granules, silica sol and fir sawdust) are mixed with 25 parts by weight of crude MDI produced by Upjohn Co. and 75 parts by weight of tolylene diisocyanate ("TDI" produced by Olin Chemical Co.) are mixed, then agitated at 30° to 50° C. for 20 to 60 minutes thereby producing an isocyanate-terminated polyurethane silicate prepolymer.

Other aldehyde-broken down alkali metal cellulose silicate copolymers may be used in place of acrolein-broken down alkali metal cellulose silicate copolymer such as formaldehyde-broken down alkali metal cellulose silicate copolymer: acetaldehyde-broken down alkali metal cellulose silicate copolymer; benzaldehyde-broken down alkali metal cellulose silicate copolymer; butylaldehyde-broken down alkali metal cellulose silicate copolymer; furfural-broken down alkali metal cellulose silicate copolymer; paraformaldehyde-broken down alkali metal cellulose silicate copolymer; phenoplast-broken down alkali metal cellulose silicate copolymer; aminoplast-broken down alkali metal cellulose silicate copolymer and mixtures thereof.

EXAMPLE 6

About 1 part by weight of the formaldehyde-broken down alkali metal cellulose silicate copolymer as used in Example 1, 50 parts by weight of polypropylene glycol (mol. wt. 1200) and 99 parts by weight of tolylene diisocyanate are mixed then agitated at 30° to 50° C. for 20 to 60 minutes thereby producing an isocyanate-terminated polyurethane silicate prepolymer.

Other polyols may be used in place of polypropylene glycol such as organic polyhydric alcohols and polyester, polyether, polybutadiene, polysulfide containing at least 2 polyhydroxyl groups per molecule.

EXAMPLE 7

About 99 parts by weight of the formaldehyde-broken down alkali metal cellulose silicate copolymer used in Example 2, 1 part by weight of polyethylene glycol (mol. wt. 380) and 50 parts by weight of "TDI" produced by Olin Chemical Co. are mixed then agitated at 30° to 50° C. for 20 to 60 minutes thereby producing an isocyanate-terminated polyurethane silicate prepolymer.

EXAMPLE 8

About 50 parts by weight of sodium metasilicate pentahydrate, 5 parts by weight of the formaldehyde-broken down cellulose silicate copolymer used in Example 2 and 99 parts by weight of MDI are mixed then agitated at about 30° C. while agitating for 20 to 60 minutes thereby producing an isocyanate-terminated polyurethane silicate prepolymer.

EXAMPLE 9

About 20 parts by weight of potassium metasilicate pentahydrate, 20 parts by weight of acetaldehyde-broken down alkali metal cellulose silicate copolymer, as produced in example 4, 20 parts by weight of "crude MDI" and 75 parts by weight of TDI are mixed then agitated at about 30° C. while agitating for 20 to 60 minutes thereby producing an isocyanate-terminated polyurethane silicate prepolymer.

EXAMPLE 10

About 10 parts by weight of fine granular sodium metasilicate pentahydrate, 5 parts by weight of silicic acid granules, 10 parts by weight of the formaldehyde-broken down cellulose silicate copolymer utilized in Example 1 and 20 parts by weight of polypropylene glycol (mol. wt. 1200) are mixed then mixed with 100 parts by weight of TDI then agitated for 20 to 60 minutes at about 30° C. thereby producing an isocyanate-terminated polyurethane silicate prepolymer, about 10 parts by weight of an initiator, triethylamine, is rapidly and thoroughly mixed with the prepolymer at a temperature of about 40° C. and in 15 to 60 seconds the mixture expands 6 to 12 times its original volume to produce a semi-rigid polyurethane silicate foam.

EXAMPLE 11

About 50 parts by weight of the isocyanate-terminated polyurethane silicate prepolymer as produced in Example 1 is thoroughly mixed with 5 parts by weight of methylene chloride then 5 parts by weight of water containing 10% by weight of triethylamine is thoroughly mixed and the mixture begins to expand in 15 to 30 seconds thereby producing a rigid polyurethane silicate foam.

EXAMPLE 12

About 50 parts by weight of the isocyanate-terminated silicate prepolymer produced in Example 1 and 30 parts by weight of water containing 30% sodium silicate and 5% triethylamine are thoroughly mixed thereby producing a polyurethane silicate putty which slowly harden over a period of hours.

EXAMPLE 13

About 50 parts by weight of the isocyanate-terminated polyurethane silicate prepolymer as produced in Example 3, and 5 parts by weight of trichlorotrifluoroethane are mixed then the mixture is mixed with 30 parts by weight of a polyethylene triol, "POLY G 30-56" produced by Olin Chemical Co., containing 10% triethylamine produced by Air Products are thoroughly mixed at about 40° C. The mixture begins to expand in 15 to 60 seconds to produce a semi-rigid polyurethane silicate which weighs about 2 pounds per cubic feet.

EXAMPLE 14

About 50 parts by weight of the isocyanate-terminated polyurethane silicate prepolymer as produced in Example 3, 30 parts by weight of a surcose amine polyether, "POLY G 71-530" produced by Olin Chemical Co., 5 parts by weight of trichlorotrifluoroethane, 50 parts by weight of Portland Cement and 50 parts by weight of plaster's sand are thoroughly mixed and poured into a mold of a concrete block. The mixture begins to expand within 60 seconds and expands 6 to 12 times its original volume to produce a polyurethane silicate rigid foam product. The product is then placed in water to wet the unreacted Portland cement thereby producing a strong polyurethane silicate concrete foamed product which has excellent flame resistant properties.

Other water-binding agents may be used in place of the Portland cement such as gypsum, burnt lime and synthetic anhydrite.

EXAMPLE 15

About 50 parts by weight of the isocyanate-terminated polyurethane silicate prepolymer as produced in Example 1 are mixed with 5 parts by weight of acetic acid and the mixture expands to produce a rigid polyurethane foamed product.

Other monocarboxylic acids may be used in place of acetic acid such as formic acid, propionic acid, butyric acid, isobutyric acid, pentanoic acid, hexane carboxylicaacid, heptane carboxylic acid, cyclohexane carboxylic acid, benzoic acid, toluic acid and mixtures thereof.

EXAMPLE 16

About 50 parts by weight of the isocyanate-terminated polyurethane silicate prepolymer as produced in Example 4 are mixed with 10 parts by weight of methanol, 3 parts by weight of triethanolamine and 0.01 part by weight of tin acetate. In 15 to 60 seconds the mixture begins to expand thereby producing a tough rigid polyurethane foam.

Other monoalcohols may be used in place of methanol such as ethanol, propanol, isopropanol, butanol, isobutanol, t-butyl alcohol and the isomeric pentanols, hexanols and heptanols, cyclohexanol, methylcyclohexanol, methallyl alcohol, allyl alcohol, cyclohexanomethanol, benzyl alcohol, butylmercaptan, phenols, thiophenols and thiocresols and mixtures thereof.

EXAMPLE 17

About 20 parts by weight of the formaldehyde-broken down alkali metal cellulose silicate utilized in Example 2, 20 parts by weight of a surcose amine polyether, "POLY G 71-356" produced by Olin Chemical Co. are thoroughly mixed then the mixture is mixed with a mixture of 35 parts by weight of crude MDI produced by Upjohn and 10 parts by weight of trichlorotri-fluoroethane at about 30° C. The mixture begins to expand in about 60 seconds to produce a rigid tough polyurethane foam which weighs about 2 pounds per cubic feet.

EXAMPLE 18

About 20 parts by weight of the formaldehyde-broken down alkali metal cellulose silicate utilized in Example 1, 50 parts by weight of polypropylene glycol (mol. wt. 1200), 30 parts by weight of sodium metasilicate pentahydrate, 5 parts by weight of triethylamine and 3 parts by weight of sodium doctyl sulfosuccinate are mixed then heated to 70° to 80° C. while agitating thereby producing an emulsion of the sodium silicate in the polyol. The emulsion at about 45° to 55° C. is rapidly and thoroughly mixed with a mixture of 80 parts by weight of crude MDI produced by Upjohn and 15 parts by weight of trichlorotrifluoroethane and in 15 to 60 seconds the mixture expands to produce a tough semi-rigid polyurethane silicate foam which weighs 2 to 2.5 pounds per cubic feet.

Although specific materials and conditions were set forth in the above examples, these were merely illustrative of preferred embodiments of my invention. Various other compositions, such as the typical materials listed above may be used where suitable. The reactive mixtures and products of my invention may have other agents added thereto to enhance or otherwise modify the reaction and products.

Other modifications of my invention will occur to those skilled in the art upon reading my disclosure. These are intended to be included within the scope of my invention, as defined in the appended Claims.

I claim:

1. The process for the production of an isocyanate-terminated polyurethane silicate prepolymer by mixing and reacting the following components:
   (a) aldehyde-broken down alkali metal cellulose silicate copolymer said broken down alkali metal cellulose silicate being produced by heating a mixture of a cellulose-containing plant, an alkali metal hydroxide and an oxidated silicon compound to 150° to 200° C. with agitation,
   (b) organic polyisocyanate or polyisothiocyanate; with the priviso that an excess of isocyanate groups are used.

2. The process of claim 1 wherein 1 to 99 parts by weight of the aldehyde-broken down alkali metal cellulose silicate copolymer are mixed with 50 to 99 parts by weight of an organic polyisocyanate or polyisothiocyanate.

3. The process of claim 1 wherein the organic polyisocyanate is selected from the group consisting of aliphatic, cycloaliphatic, araliphatic, aromatic and heterocyclic polyisocyanates and mixtures thereof.

4. The process of claim 1 wherein the organic polyisocyanate is selected from the group consisting of tolylene diisocyanate, the phosgenation product of an aniline-formaldehyde condensation and mixtures thereof.

5. The product produced by the process of claim 1.

6. The process of claim 1 wherein 1 to 50 parts by weight of a polyol is added with the aldehyde-broken down alkali metal cellulose silicate copolymer.

7. The product produced by the process of claim 6.

8. The process of claim 1 wherein 1 to 50 parts by weight of an alkali metal silicate selected from the group consisting of sodium silicate, potassium silicate and mixtures thereof is added with the aldehyde-broken down alkali metal cellulose silicate copolymer.

9. The product produced by the process of claim 8.

10. The process of claim 1 wherein 1 to 50 parts by weight of a polyol and 1 to 50 parts by weight of an alkali metal silicate selected from the group consisting of sodium silicate, potassium silicate and mixtures thereof is added with the aldehyde-broken down alkali metal cellulose silicate copolymer.

11. The product produced by the process of claim 10.

12. The process of claim 1 wherein an oxidated silicon compound selected from the group consisting of hydrate silica, silicoformic acid, natural silicate containing free silicic acid groups and mixtures thereof is added with the aldehyde-broken down alkali metal cellulose silicate copolymer.

13. The product produced in the process by claim 12.

14. The process of claim 1 wherein, an additional step is taken wherever 10% to 100% by weight of a curing agent, based on the weight of the reactants, and selected from the group consisting of water, water containing up to 10% by weight of an amine catalyst, water containing 10% to 60% by weight of a polyhydroxy compound, water containing 10% to 60% by weight of silica sol, water containing up to 5% by weight of an emulsifying agent, water containing 10% to 50% by weight of sodium silicate and mixtures thereof, is added and reacted with the isocyanate-terminated polyurethane silicate prepolymer thereby producing a polyurethane silicate product.

* * * * *